United States Patent [19]

Sakai

[11] Patent Number: 5,293,314
[45] Date of Patent: Mar. 8, 1994

[54] WORD PROCESSOR HAVING A WORD FREQUENCY COUNT UNIT

[75] Inventor: Toshiyuki Sakai, Nagoya, Japan

[73] Assignee: Brother Kogyo Kabushiki Kaisha, Nagoya, Japan

[21] Appl. No.: 754,018

[22] Filed: Sep. 3, 1991

[30] Foreign Application Priority Data

Sep. 4, 1990 [JP] Japan .................. 2-235426

[51] Int. Cl.$^5$ .................. G06F 15/38; G06F 15/40
[52] U.S. Cl. .................. 364/419.07; 364/419.17; 364/419.19
[58] Field of Search .................. 364/419

[56] References Cited

U.S. PATENT DOCUMENTS

| | | | |
|---|---|---|---|
| 4,744,050 | 5/1988 | Hirosawa et al. | 364/DIG. 2 |
| 4,782,325 | 11/1988 | Jeppsson et al. | 341/55 |
| 4,843,389 | 6/1989 | Lisle et al. | 341/106 |
| 4,876,541 | 10/1989 | Storer | 341/51 |
| 4,888,730 | 12/1989 | McRae et al. | 364/419 |
| 4,899,148 | 2/1990 | Sato et al. | 341/65 |

FOREIGN PATENT DOCUMENTS 62-256069 4/1988 Japan .

*Primary Examiner*—Roy N. Envall, Jr.
*Assistant Examiner*—A. Badendorf
*Attorney, Agent, or Firm*—Oliff & Berridge

[57] ABSTRACT

A word processor capable of determining the frequencies of use of the words in an editable text stored in the text memory includes a frequency count memory provided in an unused area of the text memory. The text memory addresses of the words in the text are stored in association with their respective frequencies of use in the frequency count memory. The configuration permits a speedy frequency count operation on the words in the text without providing a separate frequency count memory.

18 Claims, 19 Drawing Sheets

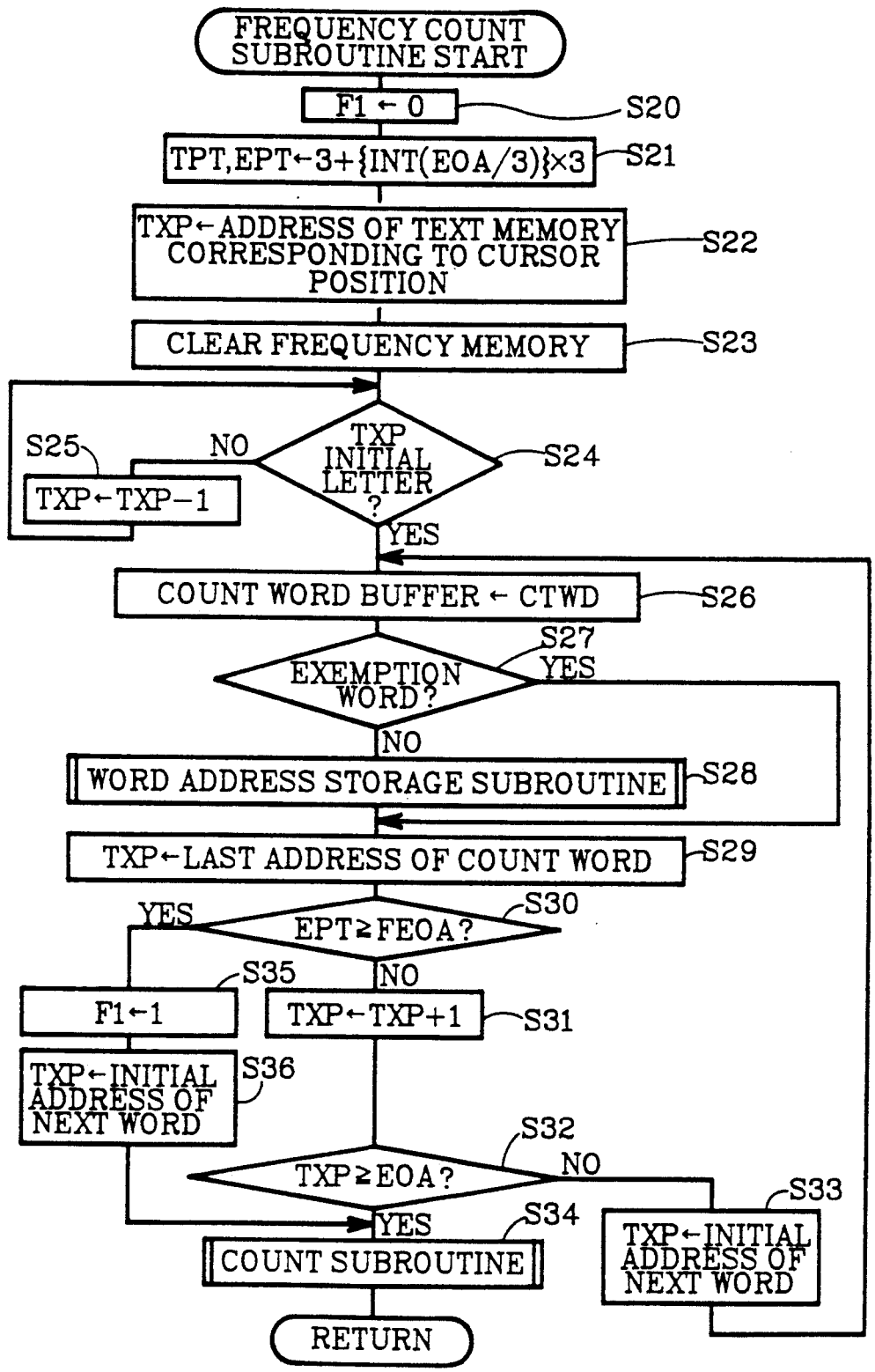

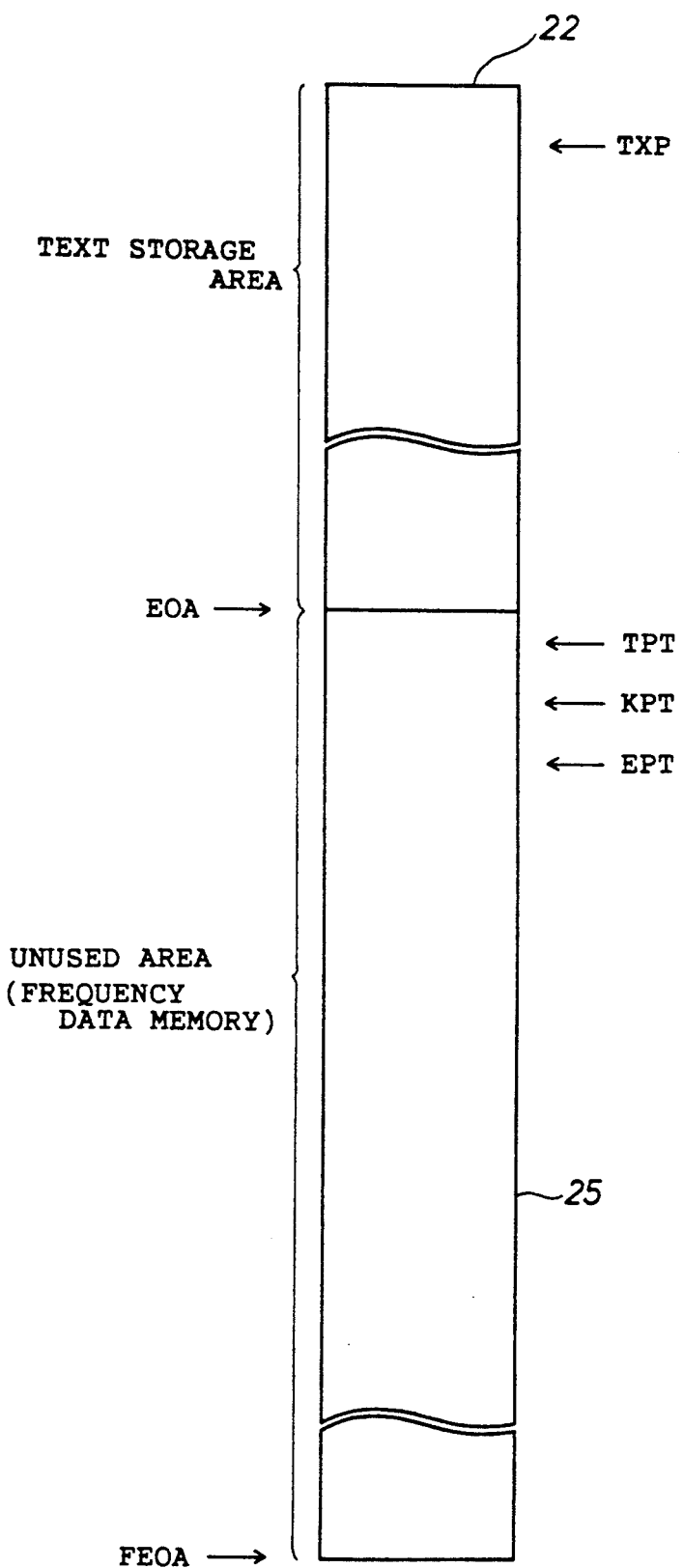

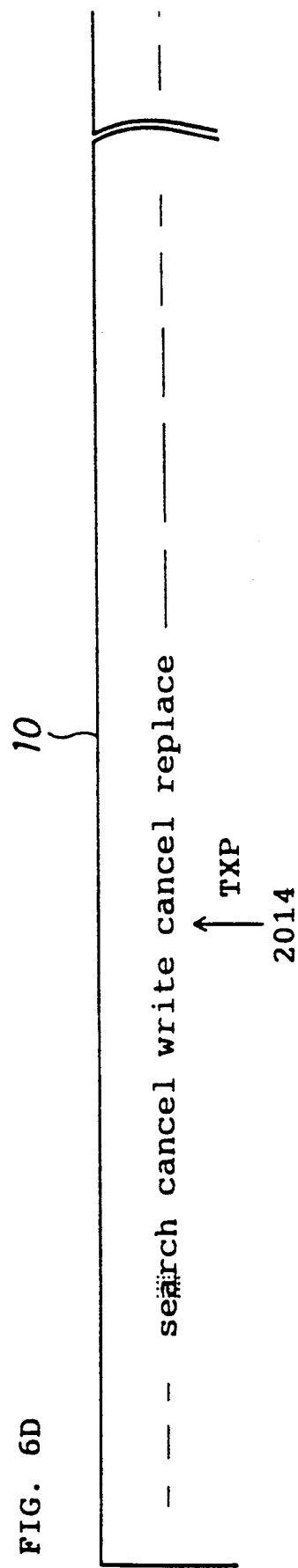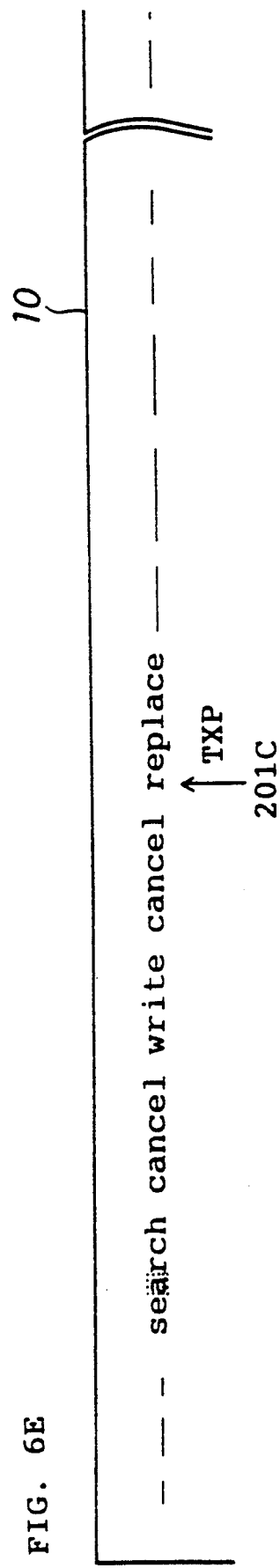

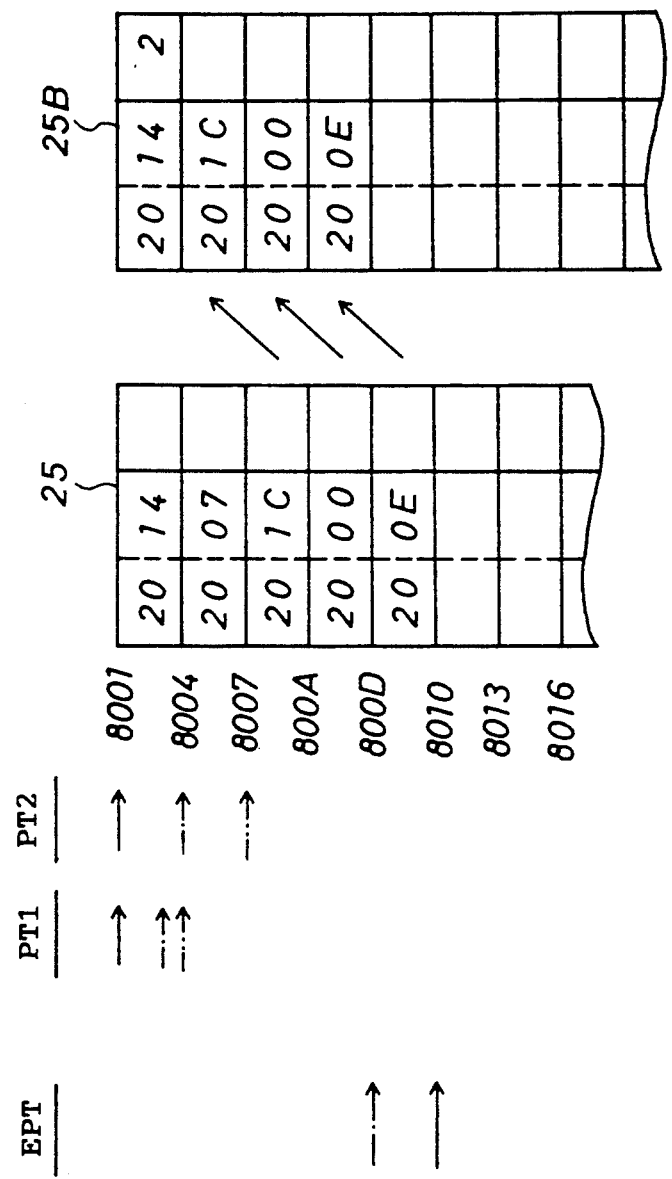

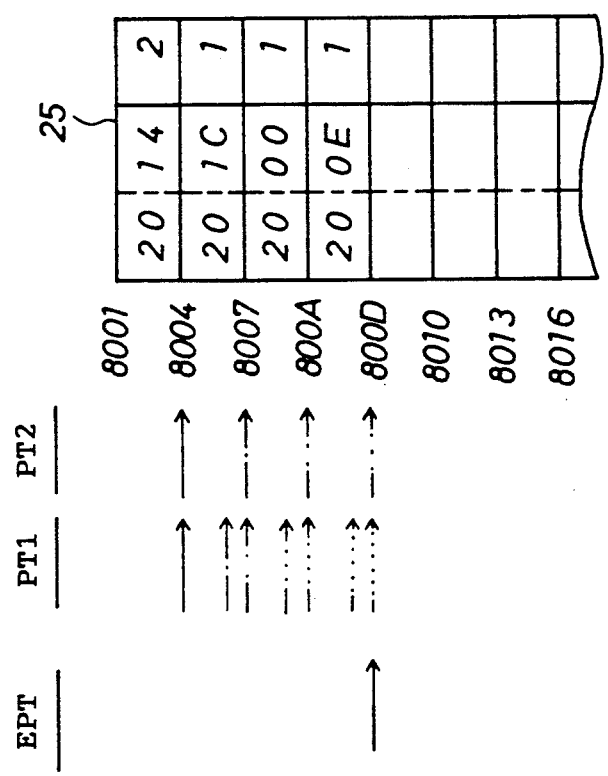

WORD PROCESSOR HAVING A WORD FREQUENCY COUNT UNIT

BACKGROUND OF THE INVENTION

The present invention relates to a word processor. More particularly, the present invention relates to a word processor having a capability of speedily determining the frequency of use of each word in a text without providing a separate memory.

Word processors have been long known which have a capability of counting a frequency of each word in a prepared, editable text. One such word processor is disclosed in U.S. Pat. No. 4,888,730, which carries out a word frequency count processing to count the frequencies of use of words once a text has been entered and subsequently presents on the display a frequency table, in which processed words are shown in association with their frequencies of use in the text. This prior-art word frequency count processing prevents a text from reading monotonous and immature by overused words.

Such a conventional word processor having a word frequency count capability generally includes a separate word frequency-of-use data memory (hereinafter a frequency data memory) for storing word data in association with a word frequency-of-use data (hereinafter frequency data) in its control unit. While successively reading out words from the first word stored in the text memory, the word processor searches for identical words to those which have already been stored in the frequency data memory. If it encounters a word identical to a previously encountered word, the word processor counts up the frequency of use of the word. For words that appear only once in the text, the word processor stores those words and their frequency data "1" in the frequency data memory.

Furthermore, if all the area of the frequency data memory is used up during a frequency count processing, the frequency count processing is carried out only on the words already stored in the frequency data memory. When a table showing frequencies of use of words in the text (hereinafter a frequency table) is shown or when the frequency table is turned off and the text is shown again, a message such as "WORD FREQUENCY COUNT INCOMPLETE" is shown. The frequency data memory is separately provided, in which a memory capacity of 20–25 bytes is available for the data of each word and the data for 1,000 different words and their frequencies of use can be stored. In this way, long words can be stored in the frequency data memory.

However, the conventional word processor having the above word frequency count capability has the problem that a large capacity frequency data memory is required. Furthermore, the whole word data must be searched through to count the frequencies of use of the words stored in the frequency data memory because the word data is stored in the frequency data memory in the order in which the words are read out from the text memory. This is a remarkably time consuming operation.

If all the available area in the frequency data memory is used up during a frequency count processing, the frequency table applies only to the words stored in the frequency data memory so that the frequencies of use of the words in the entire text cannot be determined. It is impossible to determine at which word the word frequency count processing has been interrupted.

SUMMARY OF THE INVENTION

An object of the invention is to provide a word processor that can quickly carry out a word frequency count processing by using an unused available area in a memory of the control unit.

Another object of the invention is to provide a word processor that can determine the boundary between processed words and unprocessed words in the text.

The above and other related objects are realized by a word processor having a capability of counting frequency of use of words comprises an input means for inputting a text data and an instruction data into the word processor, a text storage area provided in a text memory for storing the text data inputted by the input means, a frequency data area provided in an unused, remaining area of the text memory for storing an address data of a word data in association with a frequency data of the word data and a limit of the frequency data area being changeable according to the amount of the stored text data, a read-out means for successively reading out the word data and the address data of the word data from the text memory, an address storage means for successively storing the address data of the word data read out by the read-out means in a designated order determined in association with spelling of the word data, and a frequency count means for counting the frequency of use of the word data in the text memory based on the address data stored in the frequency data memory and of the corresponding word data in the text memory, and storing the frequency of use of the word data in association with the address data.

The word processor further comprises a determination means for determining whether or not the unused area is available in the frequency data area when the address data is stored by the address storage means.

The word processor further comprises a boundary memory means for storing the address data of either the lastly read-out word data read out by the read-out means or the next, first unread-out word data of the text storage area when the determination means determines that no available area exists in the text memory so as to determine a boundary between a counted area and an uncounted area of the text memory by the read-out means and the address storage means.

In the operation of the word processor of the invention, while the read-out means successively reads out each word and its address data from the text storage area, the address storage means successively stores the read out address data in the data memory provided in an unused area of the text storage area in a designated order. On the other hand, the determination means determines whether or not an unused area is available in the frequency data area each time an address data is stored in the frequency data area by the address storage means. The boundary memory means stores the address data of either the lastly read-out word read out by the read-out means or the next, first unread-out word of the text storage area when the determination means determines that no available area exists in the text storage area. After the address storage means completes storing the address data in the frequency data area, the frequency count means counts the frequency of use of each word based on the address data of the plural words stored in the frequency data area and the plural words in the text storage area and storing the frequencies of use of the plural words in association with their address data in frequency data area after the address data is stored by the address storage means in the frequency data area.

According to the word processor of the invention constructed as described above, the frequency data area is provided in the unused area of the text storage area whose used area is subject to change. Also, the read-out means, the address storage means, the determination means, the boundary memory means, and the frequency count means are provided to store in the frequency data area the address data of each word read out from the text storage area in a predetermined order such as the alphabetical order. At the same time, the frequency of use of each word is stored in association with its address data in the frequency data area. The address data of words in the text rather than the word data itself is stored in the frequency data area. Therefore, the capacity of the frequency data area can be greatly reduced and a remaining, unused memory area is available for this small capacity frequency data area without providing a separate frequency data area for word frequency count processing. In this way, the unused memory area is efficiently used.

Moreover, since processed words are stored in the frequency data area in the alphabetical or some other predetermined order, search for identical words is easy so that a speedy word frequency count processing is possible.

In addition, if there is no available frequency data area, the address data concerning either the lastly read-out word or the next, first unread-out word in the text storage area is held in memory to determine the boundary between the processed portion and the unprocessed portion of the text. For example, after the data is erased from the frequency data area, the word frequency count processing can be resumed at the word in the text storage area corresponding to the boundary so that the frequencies of use of the words in the text data can be correctly determined.

BRIEF DESCRIPTION OF THE DRAWINGS

FIGS. 3A-3E are flowcharts showing a word frequency count processing of the embodiment.

FIG. 4 is a memory map illustrating the relationship between a text memory and a frequency data memory of the embodiment.

FIGS. 6A-6E, FIGS. 7A-7D, and 8A and 8B are illustrations which are useful in explaining the word frequency count processing of the embodiment.

DETAILED DESCRIPTION OF THE EMBODIMENT

Figure 1:
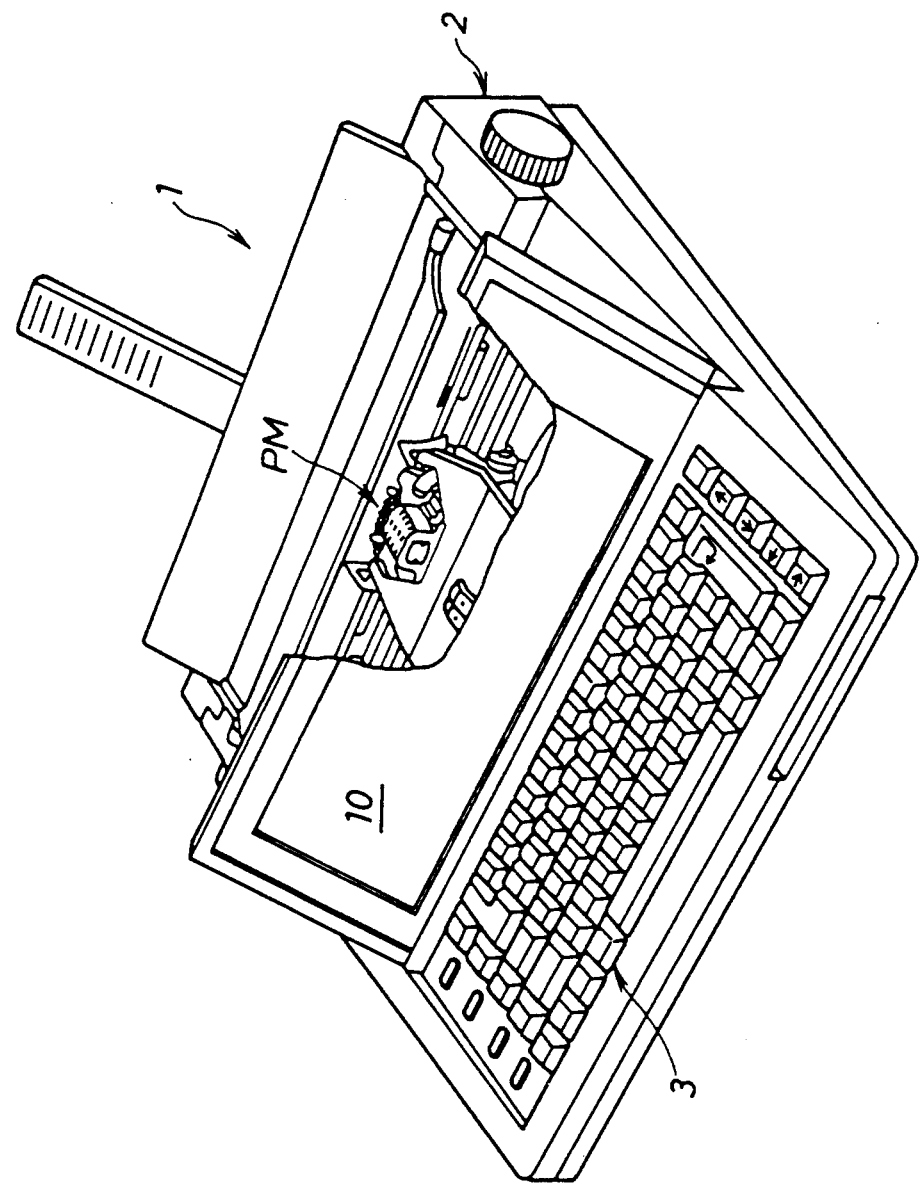
FIG. 1 is a perspective view of a word processor of a preferred embodiment of the present invention.

A preferred embodiment of the invention is hereinafter explained referring to the drawings.

As shown in FIG. 1, a word processor 1 comprises a body 2, a keyboard 3 provided in the front of the body 2, and a daisy wheel print mechanism PM provided at the back of the keyboard 3 inside the body 2. Provided also at the back of the keyboard 3 is a liquid crystal display 10 (hereinafter display 10) for displaying characters and symbols.

The keyboard 3 further comprises character keys, which includes alphabet keys, numeral keys, and symbol keys. The keyboard 3 further comprises a space key, a return key, cursor movement keys for vertically and laterally moving a cursor 40 on the display 10, a frequency count key for starting a word frequency count processing on words in a text entered in a text memory 22, a cancel key for canceling the word frequency count processing being executed, and other function keys like ordinary word processors.

The print mechanism PM has an ordinary configuration having a platen, a carriage, a daisy wheel, their respective drive circuits, and so forth.

Figure 2:
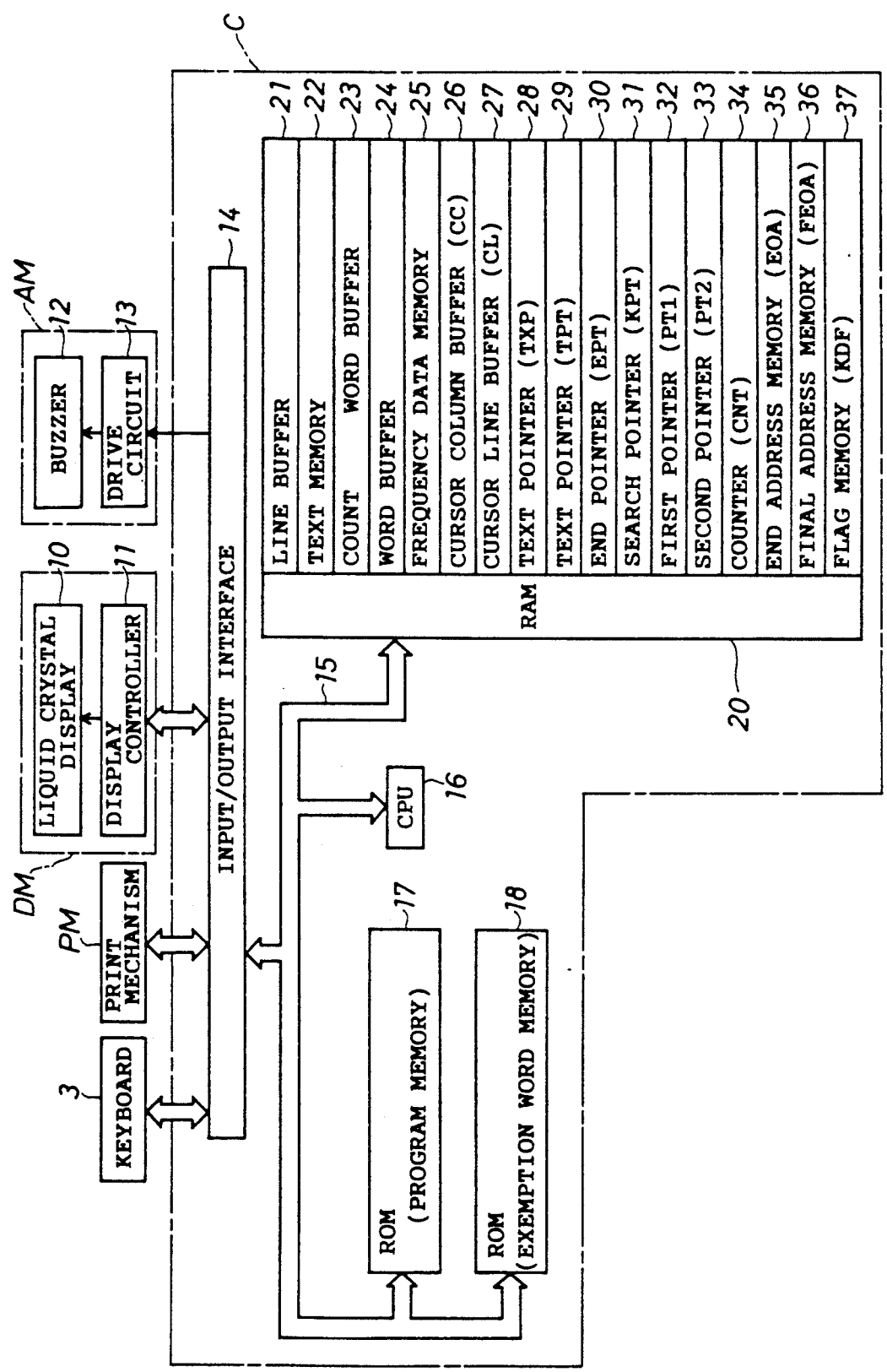
FIG. 2 is a block diagram illustrating the control system of the word processor of the embodiment of FIG. 1.

The control system of the word processor 1 is constructed as shown in the block diagram of FIG. 2. A display mechanism DM is an ordinary one including the liquid crystal display 10, a display RAM for generating display data to the display 10 and a display controller 11 including a character generator ROM storing a large number of dot patterns of letters and symbols. Denoted by symbol AM is an alarm mechanism comprising a buzzer 12 and a drive circuit 13 for driving the buzzer 12.

A control unit C comprises a CPU 16, an input/output interface 14 connected to the CPU 16 via a bus 15, and ROMs 17 and 18, and a RAM 20. A program memory in the ROM 17 includes a control program for controlling the display mechanism DM according to code data sent from the keyboard 3 and a control program for storing the code data in a line buffer 21 and the text memory 22, a cursor movement control program for moving the cursor 40 according to operation of the cursor movement keys, and a control program for controlling the word frequency count processing.

The above word frequency count control program includes an alphabetical order determination subroutine for comparing a count word data CTWD and a word data WD in the text memory 22 corresponding to the word address stored in the frequency data memory and determining which of the count word data CTWD or the word data WD is higher in the alphabetical order.

An exemption word memory 18 includes the data of articles, conjunctions, substantive verbs, and other words, whose frequencies of use do not need to be counted.

Stored in a line buffer 21 provided in the RAM 20 is data for one displayed line entered through the keyboard 3 and shown on the display 10. Alternatively, one of the plural lines of a text data read out from the text memory 22 and shown on the display 10 may be stored in the line buffer 21. In the latter case, the one line to be stored in the line buffer 21 is the line on which the cursor 40 is positioned.

Figure 5:
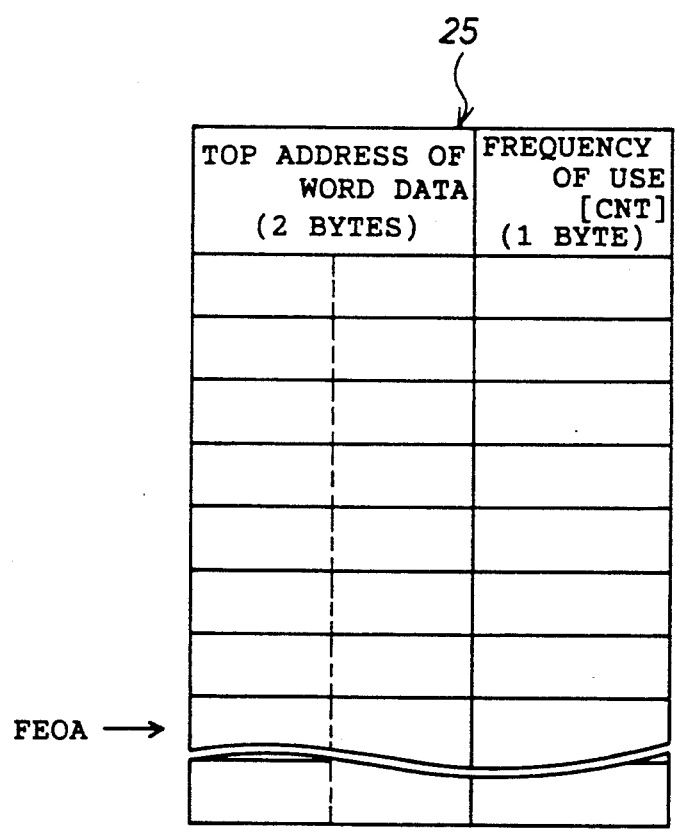
FIG. 5 is an illustration explaining the structure of the frequency data memory of the embodiment.

A text data is stored in the text memory 22 by successively receiving line-byline word data from the line buffer 21. The final address of the text memory 22 is denoted as FEOA (see FIG. 4). The word in the text memory 22 indicated by a text pointer TXP is stored in a count word buffer 23 as the count word data CTWD. A word data WD in the text memory 22 corresponding to the address pointed to by a search pointer KPT in the frequency data memory 25 is stored in a word buffer 24. The frequency data memory 25 stores the top address (2 bytes) of the count word data CTWD in the text memory 22 in association with its frequency of use CNT as the frequency data as shown in FIG. 5. The frequency data memory 25 utilizes the unused text storage area of the text memory 22 remaining after a text data is stored therein as shown in FIG. 4. Because of the limited capacity (32 Kbytes, for instance) of the text memory 22, the capacity of and the top address of the frequency data memory 25 is subject to change due to the changeable size of the text storage area. The end address of the text storage area is denoted by EOA.

A column data CC, which concerns the position of the cursor 40 in the line buffer 21, is stored in the cursor column buffer 26.

Stored in a cursor line buffer 27 is a line data CL of the line on which the cursor 40 is positioned with respect to the top line of the text memory 22. A text pointer 28 stores one address in the text memory 22. The content of the text pointer 28 is denoted by a pointer TXP. The starting address of the search area of the frequency data memory 25 at the beginning of a search operation is stored in a start pointer 29 while the end address of the search area at the beginning of a search operation is stored in the end pointer 30. The content of the start pointer 29 is denoted by a pointer TPT and the content of the end pointer 30 is denoted by pointer EPT. One address in the frequency data memory 25 is stored in a search pointer 31 whose content is denoted by a pointer KPT.

Stored in a first pointer 32 is the staring address of a search area of the frequency data memory 25 during a search operation while the ending address of the search during a search operation is stored in a second pointer 33. The content of the first pointer 32 is denoted by a pointer PT1 and that of the second pointer 33 is denoted by a pointer PT2. A counter 34 stores the frequency of a count word. The content of the counter 34 is denoted by count value CNT. The end address EOA of the text storage area of the text memory 22 is stored in an end address memory 35. The final address FEOA of the text memory 22 is stored in a final address memory 36. Stored in a flag memory 37 is a flag data of a frequency data display flag KDF, which is set (its data is "1") while a frequency data is shown on the display 10. Also stored in the flag memory 37 is a flag data of an overflow flag F1, which is set when there is no area available to store frequency data in the frequency data memory 25. In addition, various memories for temporarily storing the results of operations the CPU 16 performs, other counters, and pointers are provided in the ROM 20.

Word frequency count process steps are explained hereinafter with specific reference to the flowcharts of FIGS. 4A to 4E.

When the word processor 1 is first turned on, the above process steps start with initialization, which includes setting an input mode of a text data, storing the final address FEOA of the text memory 22 in the final address memory 36, and clearing the memories 21-37 at step S1. The initial value of each of the various buffers, memories, and pointers, and a counter provided in the RAM 20 is zero except for those of the text pointer TXP and the final address memory FEOA. The initial value of the text pointer TXP is the top address of the text storage area of the text memory 22 while that of the final address memory FEOA is the final address of the text memory 22.

It is determined at step S2 if the keyboard 3 is operated. If it is determined YES at this step S2, the program goes to step S3, where it is determined if the frequency count key has been depressed. If it is NO at this step, the program goes to step S8, at which it is determined if the cancel key has been depressed. If it is NO at this step, the program goes to step S15, where process steps according to the inputted signal are carried out. More specifically, while code data corresponding to the entered character or symbol is stored in the line buffer 21 and the text memory 22, corresponding character or symbol is shown on the display 10 at this step S15. Thus, the text data is stored in the text memory 22 and an updated end address EOA is stored in the end address memory 35 based on the amounts of the entered text data.

Figure 3A:
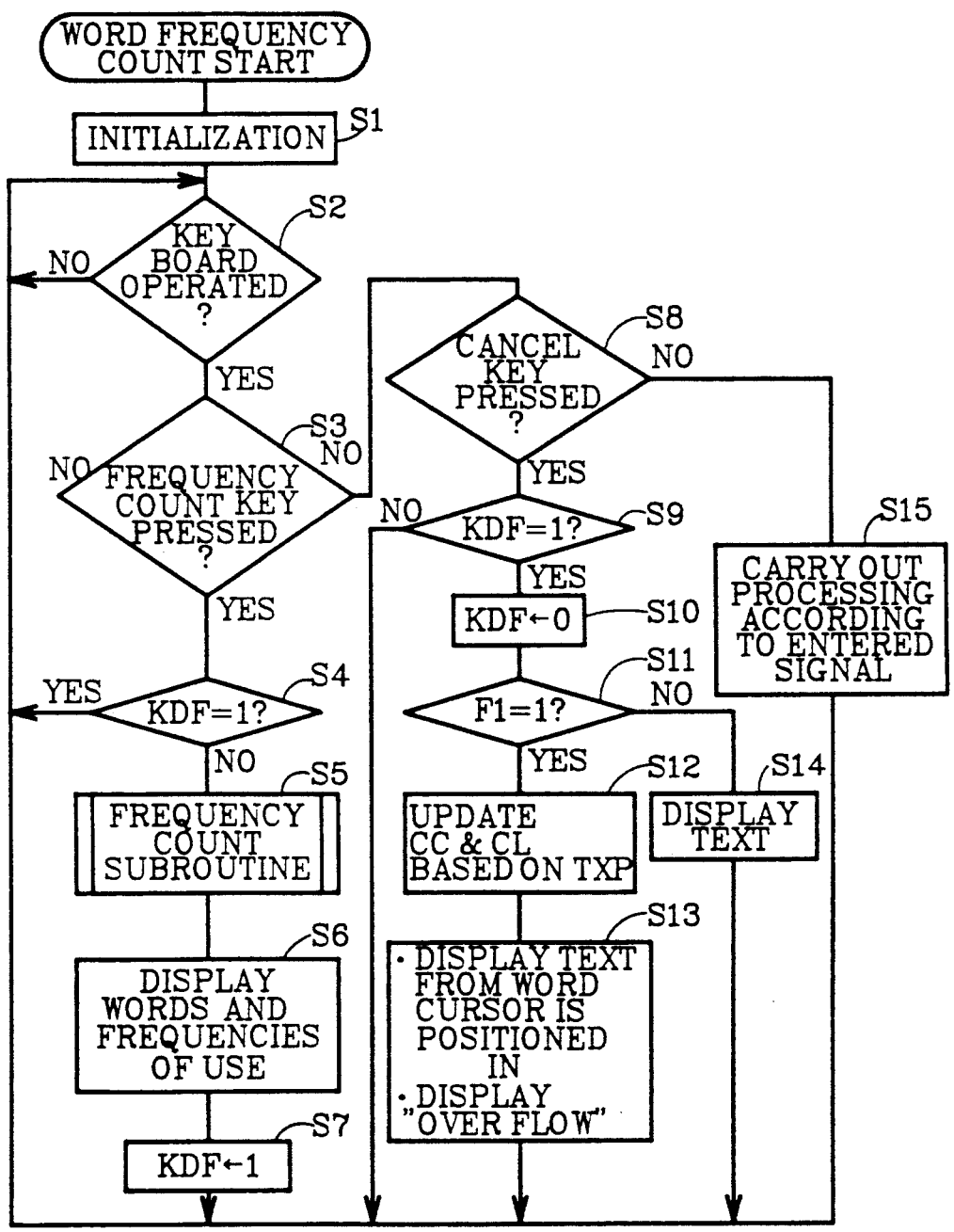

Now, the program returns to step S3 via step S2, at which it is determined YES this time. If the frequency count key is depressed, hence determining YES at step 3 after a text is entered, the program advances to step S4, at which it is determined if the frequency data display flag KDF is set and the frequency data is shown on the display 10. If NO, a frequency count subroutine starts at step S5 as shown in FIG. 3B.

First, the program is shifted to step S20, where the flag F1 is reset. The program advances to step S21, where the smallest of the addresses of the frequency data memory that are larger than the end address EOA and a multiple of 3 is determined based on the end address EOA and stored in the pointer TPT and in the pointer EPT. For example, if the end address is 8000, an address 8001 will be stored in the pointers TPT and EPT. INT(X) in the attached flowcharts denotes the integer of a figure X. All the addresses in the embodiment are expressed in hexadecimal digits. The program then proceeds to step S22 at which the address of the text memory 22 corresponding to the displayed position of the cursor 40 is determined based on the column data CC of the cursor column buffer 26 and the line data CL of the cursor line buffer 27 and stored in the text pointer 28 as the pointer TXP. The program goes on to step S23 to clear the frequency data memory 25.

Then, the program proceeds to step S24 to determine if the pointer TXP points to the initial letter of the word in which the cursor 40 is positioned. If it is NO, i.e., the code at the address immediately before the pointer TXP is not a punctuation code or the pointer TXP does not points to the initial letter, the program proceeds to step S25, where the pointer TXP is decremented by 1. This loop of steps S24 and S25 is repeated until the pointer TXP points to an initial letter to store in the pointer TXP the initial letter of the word in which the cursor 40 is positioned. If it is YES at step S24, the program is shifted to step S26. At this step, a series of data from the code of the initial letter address pointed to by the pointer TXP to the code of the address located immediately before the next punctuation code, i.e., the data of the word, are read out and stored in the count word buffer 23 as a count word data CTWD. The program advances to step S27, at which it is determined if the count word data CTWD is an exemption word. If it is determined NO at step S27, a word address storage subroutine starts at step S28.

Figure 6A:
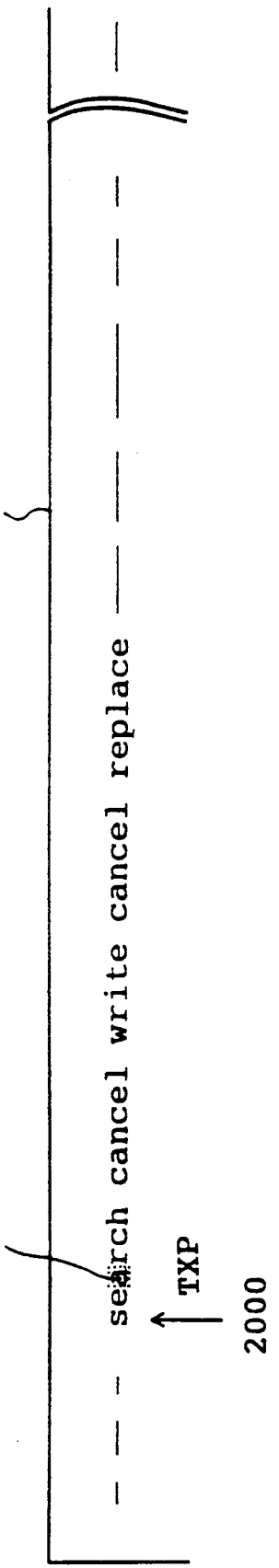

Specifically, if the cursor 40 is positioned over the "a" of a "search" as shown in FIG. 6A, the address 2000 in the text memory 22 corresponding to the initial letter "a" of the "search" is stored in the pointer TXP while the word data of the count word "search" is stored in the count word buffer 23.

Figure 3C:
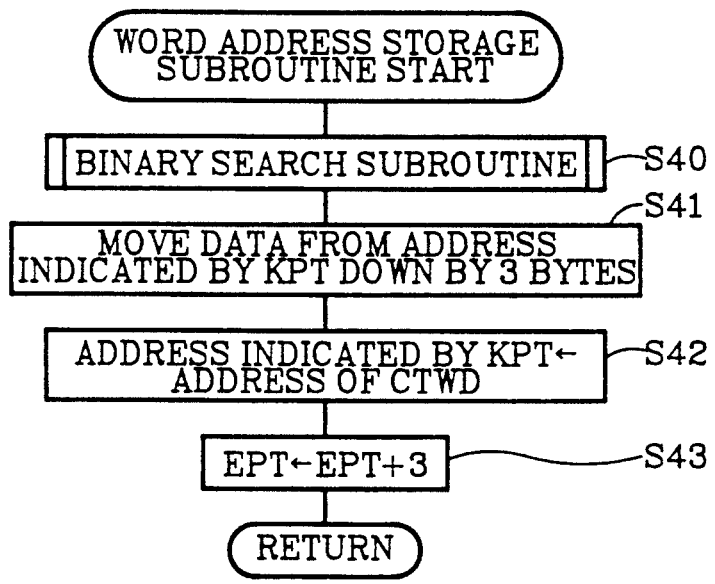
Figure 3D:
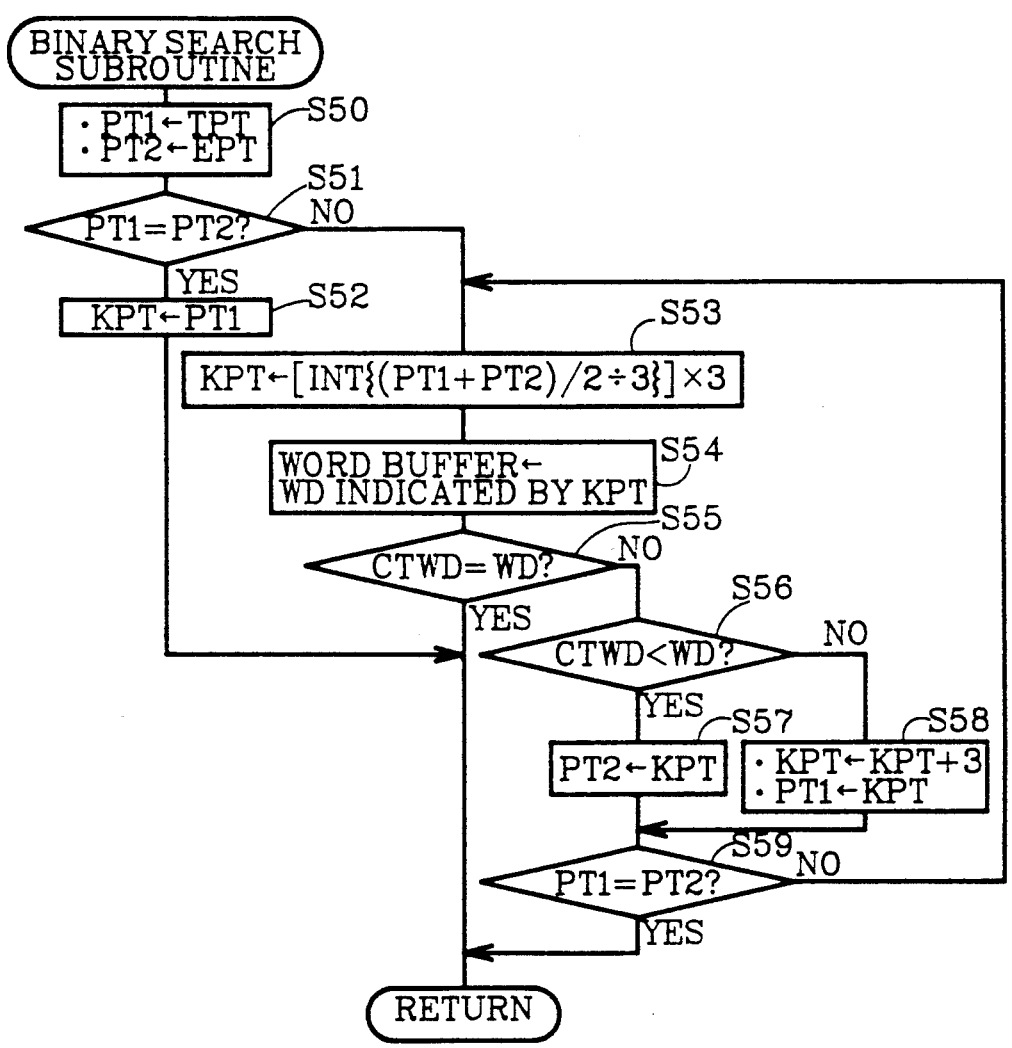
Figure 7A:
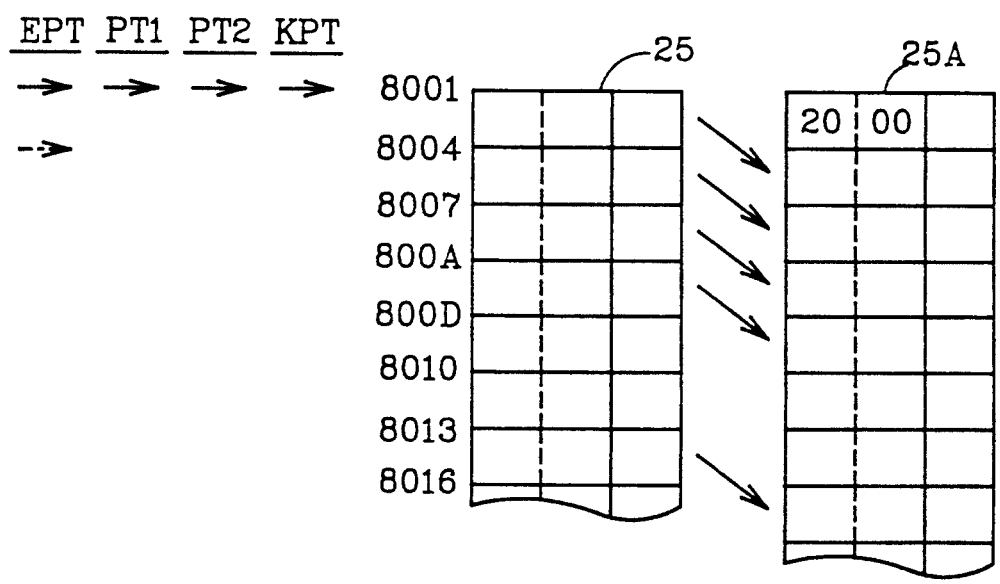

Now, as shown in FIG. 3C the program is shifted to step S40 where a binary search subroutine starts as shown in the flowchart of FIG. 3D. At step S50, the data of the pointer TPT is stored in the pointer PT1 and the data of the pointer EPT in the pointer PT2 and the program proceeds to step S51. At step S51, it is determined if the pointer PT1 is equal to the pointer PT2. Because it is determined YES immediately after this subroutine starts, the program goes to step S52, where the data of the pointer PT1 is stored in the pointer KPT. The program exits from this subroutine and returned to step S41. The data stored at the address pointed to by the pointer KPT and the following addresses are moved and stored in the respective addresses 3 bytes down from the original addresses at step S41. The program advances to step S42, at which the text memory address of the count word data CTWD is stored in the address of the frequency data memory 25 pointed to by the pointer KPT. The program goes on to step S43, at which the pointer EPT is incremented by 3 bytes. As shown in FIG. 7A, the top address 2000 of the "search" pointed to by the pointer TXP are stored in the addresses from 8001 pointed to by the pointer KPT and the pointer EPT points to the address 8004. The contents of the frequency data memory 25 in which the data stored at and after the address pointed to by the pointer KPT are moved down by 3 bytes are indicated at 25A.

The various lateral arrows under the respective pointers in FIGS. 7A-7D and 8A-8B indicate changes of addresses pointed to by the pointers. More specifically, the arrows in solid line indicate current addresses pointed to by pointers while the arrows in a dot-dash-line indicate addresses pointed by pointers in subsequent stages of the process steps. An arrow in a single-dot-dash-line points to the address the corresponding pointer will point to in the next stage from the current stage indicated by the corresponding solid line arrow. An arrow in a double-dot-dash-line points to the address the corresponding pointer will point to in the stage after the next. In the same manner, the more dots there are in an arrow, the later stage of the processing the arrow indicates.

The program exits from the word address storage subroutine and goes to step S29 as shown in FIG. 3B. If it is determined YES at step S27, the program also goes to step S29. At this step, the pointer TXP is incremented until it points to the address of the last letter of the current count word. The program proceeds to step S30 to determine if the data of the pointer EPT is greater than or equal to the final address FEOA which indicates there is no unused memory area in the frequency data memory 25 available to store frequency data. If NO, the program goes to step S31, at which the text pointer TXP is incremented. At the next step S32, it is determined if the data of the pointer TXP is greater than or equal to the end address EOA. If it is determined NO at this step indicates that another word is stored in the text memory 22, and the program is shifted to step S33. At step S33, the address of the initial letter of the next word data is stored in the pointer TXP. The program returns via steps S26 and S27 to step S28 where the word address storage subroutine is carried out. At this moment, the pointer TXP points to the address 2007 as shown in FIG. 6B while a word "cancel" is stored in the count word buffer 23.

At step S40, the binary search subroutine starts again. The program goes via steps S50 and S51 to step S53, at which the pointer KPT points to the middle address of the search area of the frequency data memory 25 indicated by the pointer PT1 and PT2. The program goes to step S54, at which the word data whose text memory address is stored at the address pointed to by the pointer KPT is stored in the word buffer 24 as a word data WD. The program advances to the step S55 to determine if the count word data CTWD is equal to the word data WD based on an order determination subroutine. If it is determined YES at this step, the program is shifted to step S41. If, on the other hand, it is NO, the program goes to step S56, at which it is determined if the count word data CTWD is higher than the word data WD in the alphabetical order. If it is YES, the program goes to step S57, at which the data of the pointer KPT is stored in the pointer PT2 to narrow the search area by moving the lower search limit toward the upper search limit. If it is NO at step S56 to indicate that the word data WD is higher than the count word data CTWD, the program proceeds to step S58, at which the data of the pointer KPT is stored in the pointer PT1 to narrow the search area by moving the upper search limit toward the lower search limit. Then, the program goes to step S59 to determine if the data of the pointer PT1 is equal to that of the pointer PT2. If No, the program returns to step S53. The steps S53 to S59 described above are repeated until it is determined YES at step S59. Then, the program goes to steps S41, S42, and S43 and exits the word address storage subroutine to return to step S29. Steps S26 to S33, S40 to S43, and S50 to S53 are repeated until it is determined YES at step S30 or step S32.

Figure 3E:
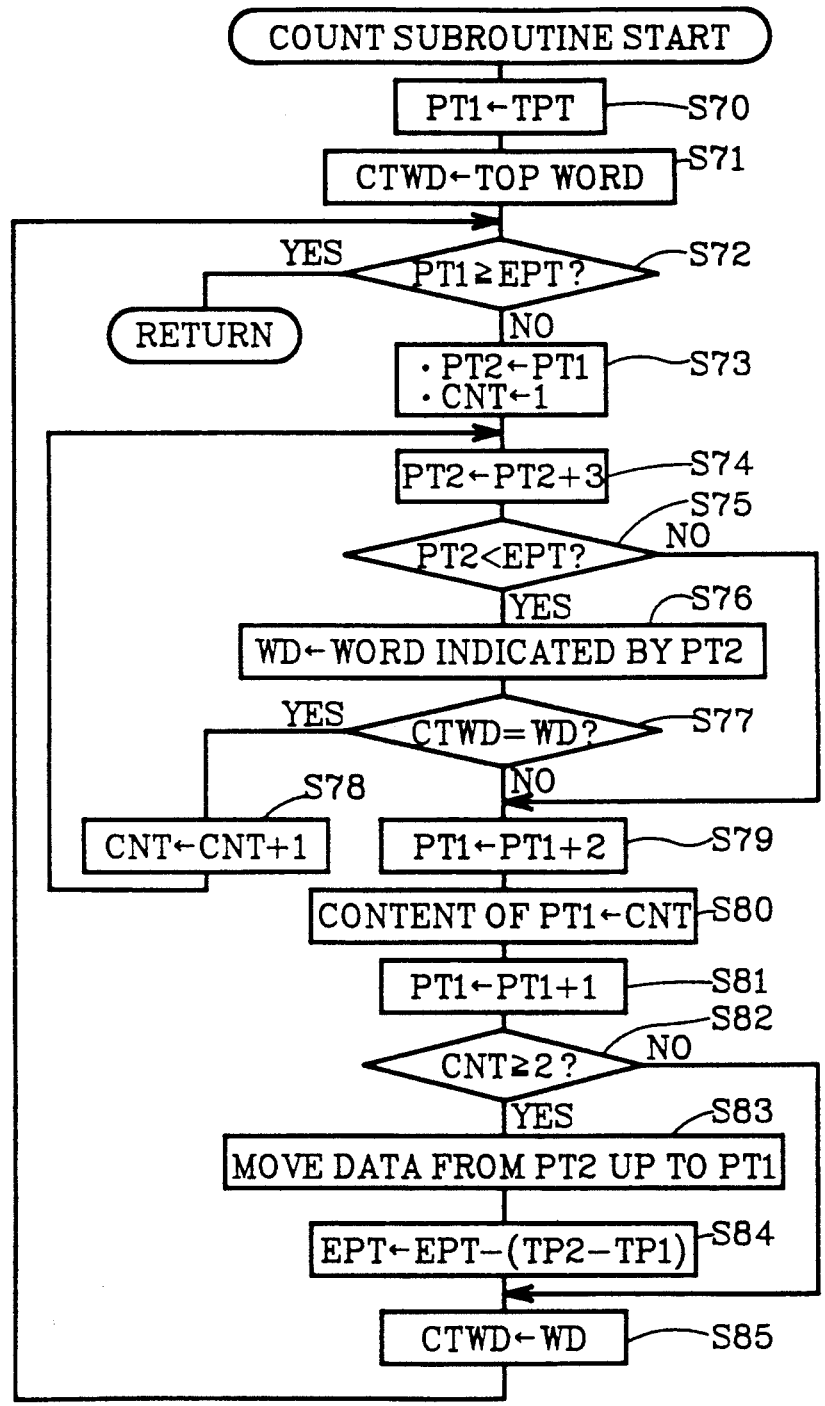

If it is determined YES at step S32 to indicate that the initial letter addresses of all the words in the text memory 22 are stored in the frequency data memory 25, a count subroutine is performed as shown in the flowchart of FIG. 3E. If it is determined YES at step S30 to indicate that there is no unused area available in the frequency data memory 25, the program goes to step S35, at which the flag F1 is set. At the following step S36, the initial letter address of the next, first unread word data is stored in the pointer TXP and the program goes to step S34 to execute the count subroutine.

Figure 6B:
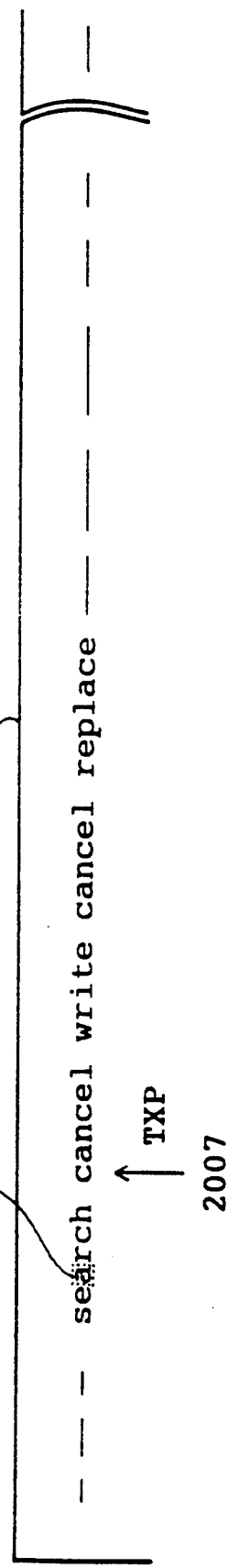
Figure 7B:
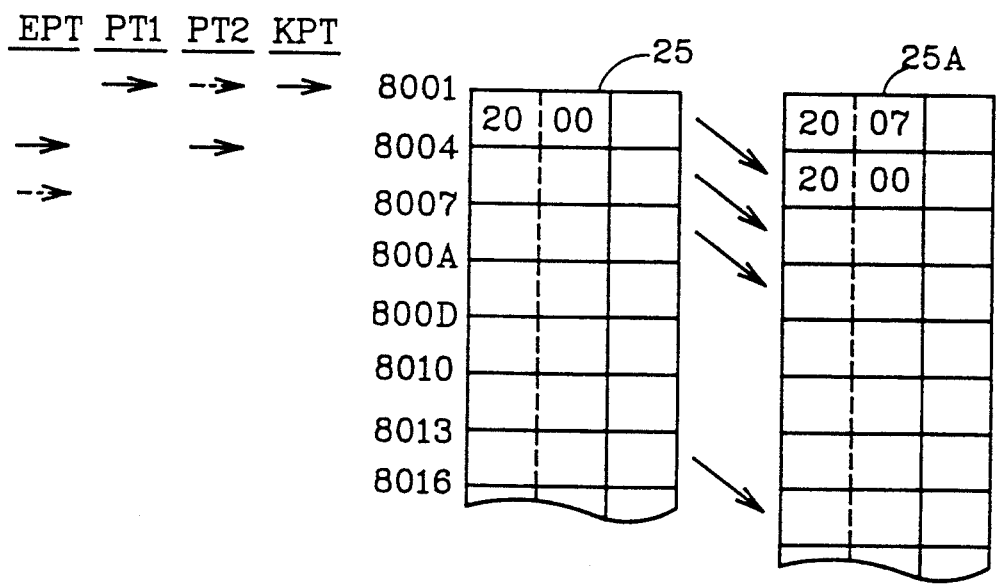

Specifically, as shown in FIG. 6B, for example, when the pointer TXP points to the address 2007 and the count word data CTWD is a "cancel" as shown in FIG. 7B, the address 8001 is stored in the pointer PT1 and the address 8004 is stored in the pointer PT2 at step S50. The program goes on to step S51, at which it is determined NO this time. Now, the program goes to step S53, at which the pointer KPT indicates the address 8001 based on the following formula: [INT {8002.5/3}]×3. The program advances to step S55, which determines the count word data CTWD is not equal to the word data WD, and the program advances to step S56. At this step, because the count word data CTWD ("cancel")< the word data WD ("search"), the program goes to step S57, where the pointer PT2 indicates the same address 8001 as the pointer KPT. Subsequently, step S59 determines the pointer PT1 is equal to PT2 and the program goes via S41 to step S42, which stores the address 2007 of the count word "cancel" immediately before the address 2000 of the word "search". Then, the program exits from this routine at step S43.

Figure 6C:
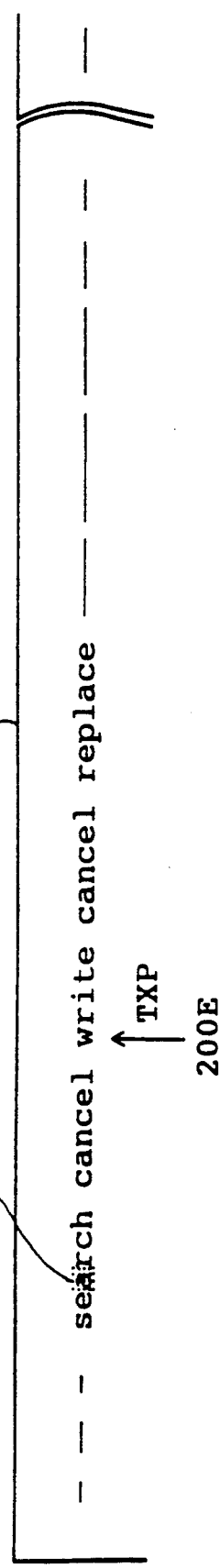
Figure 7C:
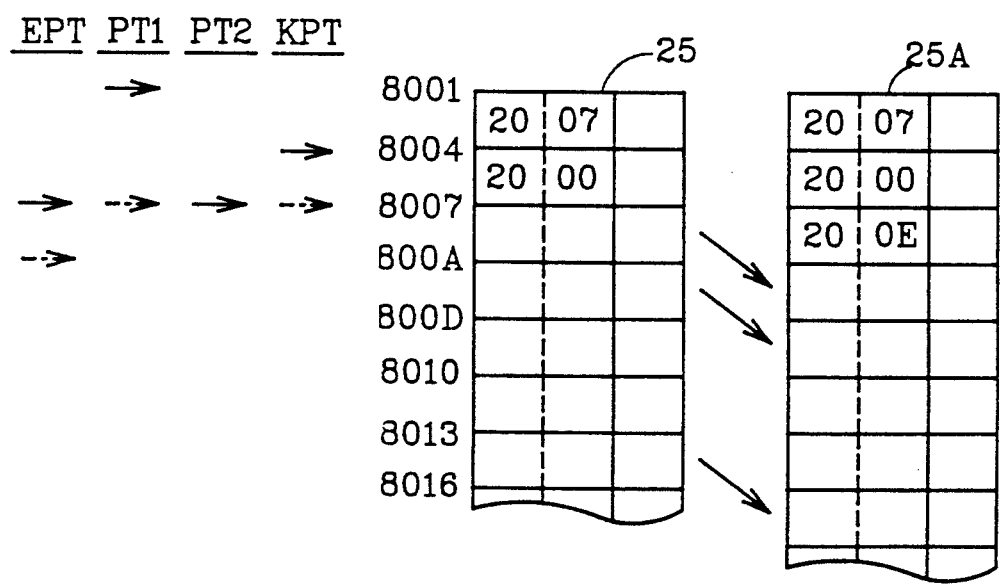
Figure 7D:
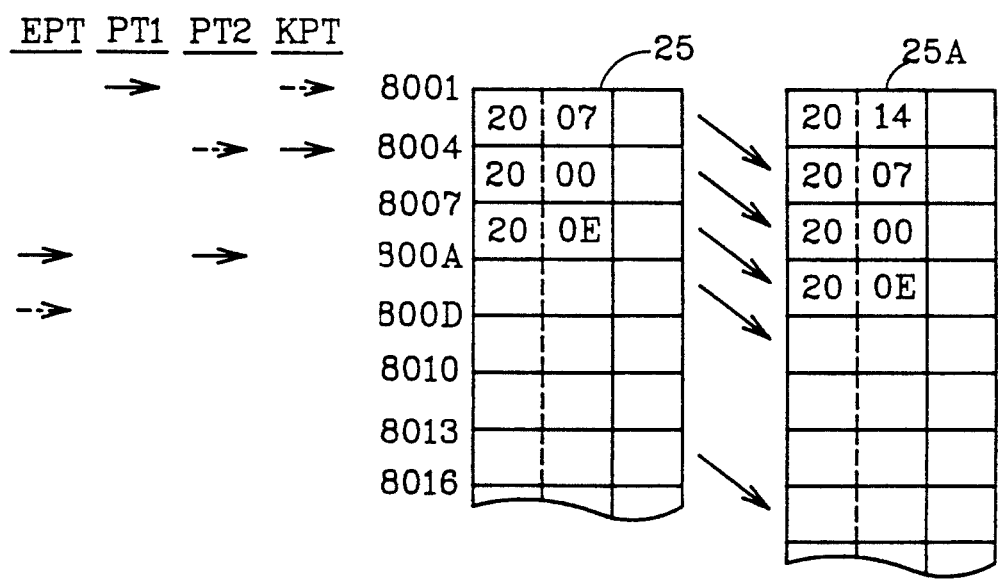
Figure 9:
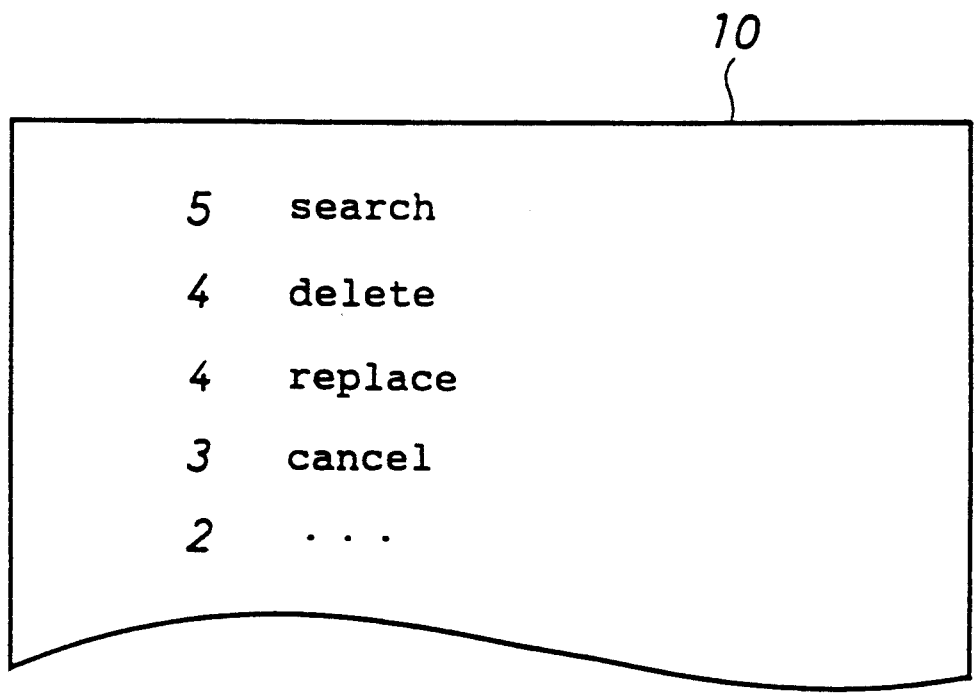
FIG. 9 is an illustration of an exemplary chart of frequency data and corresponding words of the embodiment.

If the count word is a "write" as shown in FIG. 6C, the address 200E is stored in the pointer TXP. In this case, because the count word data CTWD> the word data WD ("search"), the pointers PT1 and KPT point to the address 8007 and the address 200E of the count word "write" is stored immediately after the address 2000 as shown in FIG. 7C.

If the next count word is a "cancel" as shown in FIG. 6D, the address 2014 is stored in the pointer TXP. Because the count word data CTWD is higher than the word data WD ("search") in the alphabetical order, the pointers PT2 and KPT point to the address 8004, halving the search area. Moreover, the pointer KPT points to the address 8001. As a result, because the count word data CTWD is the same as the word data WD, the address 2014 of the count word "cancel" is stored immediately before the address 2007 ("cancel").

As shown in FIG. 6E, because the next count word is a "replace", its address 201C is stored in the pointer TXP.

The same process steps are performed on all the word data in the text memory 22 to store all the initial letter addresses in the frequency data memory 25. However, if it is determined YES at step S30 to indicate that there is no memory area available for the frequency data memory 22, the top addresses of the words that have been read out are stored in the frequency data memory 25 and the overflow flag F1 is set at step S35. The program goes on to step S36, where the address of the initial letter of the next, first unread word is stored in the pointer TXP. The program goes to step S34, where the count subroutine is carried out. The details of step S34 are shown in FIG. 3E.

FIG. 3E is a flowchart which corresponds to step S34 shown in FIG. 3B. When the count subroutine starts at step S70, the data of the pointer TPT is stored in the pointer PT1. Then, the program proceeds to step S71, at which the word data in the text memory 25 corresponding to the address stored in the top of the frequency data memory 25 is stored in the count word buffer 23. The program proceeds to step S72, where it is determined if the end pointer EPT is smaller than or equal to the pointer PT1. If NO at this step, the program goes to step S73, at which the data of the pointer PT1 is stored in the pointer PT2 and "1" is stored in the counter 34 as a count value CNT. The program goes on to step S74, at which the pointer PT2 is incremented by 3 to indicate the next address. The next step S75 determines if the pointer PT2 is smaller than the end address EOA. If the answer is YES, the program goes to step S76, at which the word data corresponding to the address pointed to by the pointer PT2 is stored in the word buffer 24. Then, the program goes to step S77, where it is determined if the count word data CTWD is equal to the word data WD. If it is YES, the program goes to step S78, at which the count value CNT is incremented by 1. Then, steps S74–S77 are repeated.

If the answer is NO at step S77, the program is shifted to step S79, where the pointer PT1 is incremented by 2. At step S80, the count value CNT is stored in the address pointed to by the pointer PT1 as the frequency of use. The program goes to step S81, where the pointer PT1 is further incremented by 1.

Step S82 determines if the count value is no less than 2, i.e., if plural identical words are stored in adjacent addresses. If YES, the program goes to step S83, at which the data of the address pointed to by the pointer PT2 and the following addresses are moved up to the respective addresses from the one pointed to by the pointer PT1. In this way, the data of only one of the plural identical words is stored. Then, the program advances to step S84, at which the bytes corresponding to the deleted frequency data at step S83 are subtracted from the address stored in the pointer EPT, i.e., the pointer EPT is moved up to a higher address by the same bytes as at step S83. The program then goes to step S85, at which the word data WD is stored in the count word buffer 23 as the count word data CTWD. Then, the program returns to step S72.

Steps S72 to S85 described above are repeated until a count value CNT is stored in each of the frequency data in the frequency data memory 25 and the pointer PT1 is equal to the pointer EPT. As shown in FIG. 8A, for example, if the same word "cancel" is stored in the addresses 8001 and 8004, "2" is stored as the count value CNT of the frequency data corresponding to the first word "cancel". Also, the addresses from the address 8007 pointed to by the pointer PT2 are moved up and stored in the respective addresses from 8004 pointed to by the pointer PT1 so that the contents of the frequency data memory 25 will be as denoted by 25B and the value decremented by 3 is stored in the pointer EPT. Subsequently, as shown in FIG. 8B, "1" is stored for "replace", "search", and "write" as their frequency of use by repeating the above explained.

The program now exits from the count subroutine and goes to step S6, at which the display 10 changes to show a table of processed words in a predetermined order in association with their frequencies of use. In this embodiment, processed words and their respective frequencies of use are shown in the order of frequency of use. The table may be in the alphabetical order or in the order of word length. Then, the program goes to step S7, at which the frequency data display flag KDF is set. The program returns to step S2.

Figure 10:
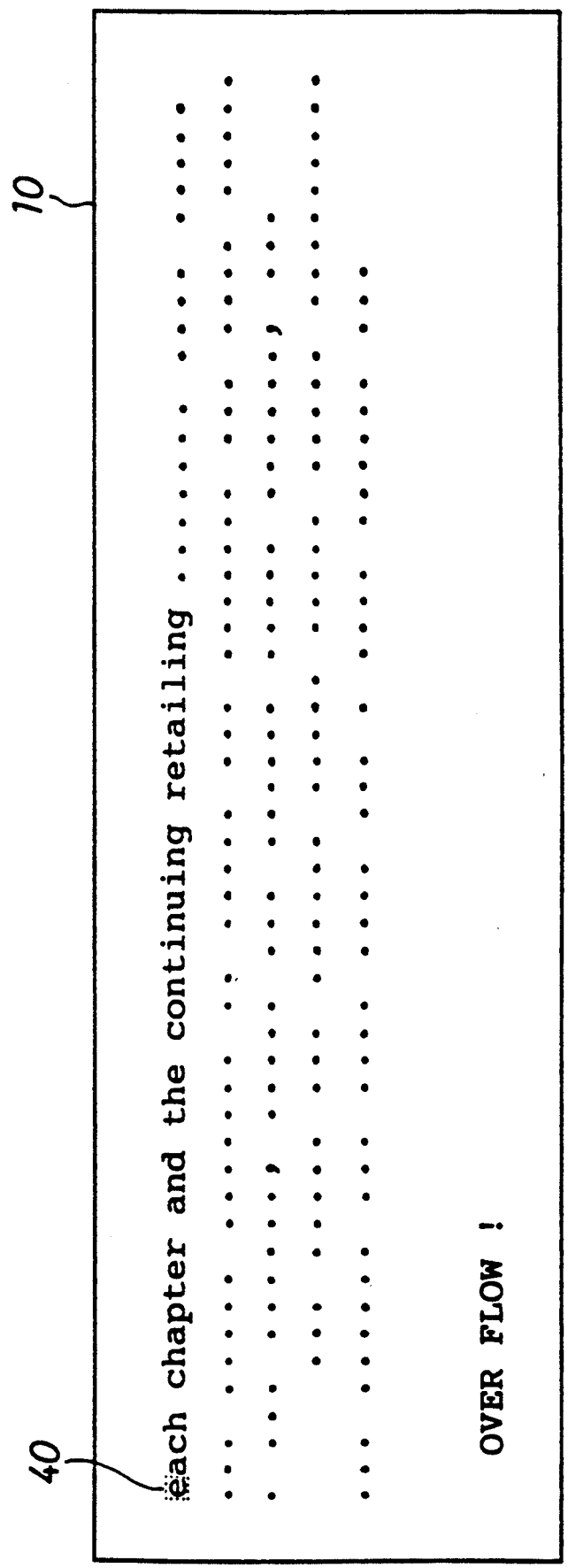
FIG. 10 is an exemplary screen display of a text data that appears if there is no unused frequency data memory area.

On the other hand, if the cancel key is pressed while frequency data is shown; that is, if steps S2, S8, and S9 answer YES and step S3 NO, the frequency data display flag KDF is reset at step S10. Then, the program goes to step S11, which determines if the flag F1 has been set. If NO, the program proceeds to step S14, where the text shown immediately before the frequency count key was depressed is reinstated on the display 10. If step S11 determines YES to indicate the overflow flag F1 has been set and there is no available memory in the frequency data memory 25 during a frequency data processing, the program goes to step S12. At step 12, the column data CC and the line data CL are updated based on the text pointer TXP. Then, the program goes to step S13, at which the cursor 40 is moved onto the initial letter of the first, unprocessed words based on the updated data CC and CL and a message "OVER FLOW !" appears on the message line of the display 10. The word in the text memory 22 based on the text pointer TXP may be reversal-displayed or made to blink. As shown in FIG. 10, the display 10 shows "OVER FLOW !" and the unprocessed words starting from an "each" while the cursor 40 is positioned over the initial letter "e" of the first unprocessed word "each".

As explained above, the address of each count word read out from the text memory 22 is stored in the frequency data memory 25 in the alphabetical order as in an English dictionary. At a search operation performed on a word data WD which is the same as a count word data CTWD, the search area is halved, hence realizing a speedy frequency count operation on a count word.

Moreover, because only the addresses (2 bytes) of the count words in the text memory 22 and their frequencies (1 byte) are stored in the frequency data memory 25, a much smaller memory capacity suffices for the frequency data memory 25. Therefore, this small capacity frequency data memory 25 does not have to be separately provided, but can be provided in the unused memory area of the text memory 22, thereby efficiently utilizing the unused memory area.

Furthermore, if there is no unused memory area available for the frequency data memory area 25, the word processor of the present embodiment stores the address of the first unread out word in the text memory 22 immediately after the lastly read-out word in the text memory 22. Thus, the unprocessed words can be identified based on the above address of the first unread out word. The word processor of the embodiment can accurately count the frequencies of use of the words in a text data by resuming the suspended frequency count operation from the first unread-out word.

If the available memory area for the frequency data memory 25 runs out, the address of the lastly read-out word in the text memory 22 may be stored to distinguish processed words and unprocessed words.

The present invention may also be applicable to various types of document editing units including electronic type writers and word processors.

What is claimed is:

1. A word processor having a capability of counting frequency of use of words, comprising:
   (a) an input means for inputting a text data and an instruction data into the word processor;
   (b) a text storage area provided in a text memory for storing the text data inputted by the input means;
   (c) a frequency data area provided in an unused, remaining area of the text memory for storing an address data of a word data in association with a frequency data of the word data and a start point for defining the frequency data area being changeable according to an amount of the text data stored therein;
   (d) a read-out means for successively reading out the word data and an address data of the word data from the text memory;
   (e) an address storage means for successively storing the address data of the word data read out by the read-out means in the frequency data area according to a predetermined order;
   (f) a frequency count means for counting the frequency of use of the word data in the text memory based on the address data stored in the frequency data memory and of the corresponding word data in the text memory, and storing the frequency of use of the word data in association with the address data;
   (g) a determination means for determining whether unused area is available in the frequency data area when the address data is stored by the address storage means; and
   (h) a boundary means for storing the address data of either a lastly read-out word data read out by the read-out means or a next, first unread-out word data in the text storage area when the determination means determines that no available area exists in the text memory thereby creating a boundary between a counted area and an uncounted area of the text storage area.

2. A word processor according to claim 1, wherein
   (c1) the frequency data area stores 2 bytes of the address data of the word data in the text storage area and 1 byte of the frequency data in the frequency data area.

3. A word processor according to claim 1, wherein the address storage means includes:
   (e1) an alphabetical order determination means for comparing a count word data read-out by the read-out means and the word data in the text storage area corresponding to the address stored in the frequency data area and determining an alphabetical order between the count word data and the word data.

4. A word processor according to claim 1, wherein the determination means includes:
   (g1) judgment means for judging whether the address of an end word data in the frequency data area is less than a final address of the text memory in order to judge whether there is unused area in the frequency data area available to store the address data and the frequency data for the end word data.

5. A word processor according to claim 4, wherein the determination means includes:
   (g2) judgment means for determining whether an unused area is available in the frequency data area each time the address data is stored in the frequency data area by the address storage means.

6. A word processor according to claim 5, wherein the determination means includes:
   (g3) judgment means for judging whether a storage location of a last word data of the text storage area is less than the end address of the text memory.

7. A word processor according to claim 1, wherein the boundary memory means includes:
   (h1) means for storing the address of the next, first unread-out word data when there is no unused memory area available for the frequency data area.

8. A word processor according to claim 7, wherein the boundary memory means includes:
   (h2) means for identifying uncounted word data in the text storage area based on the address of the first unread-out word data and means for resuming a suspended frequency counting operation thereby accurately count the frequency of use of the word data in the text storage area.

9. A word processor according to claim 1, wherein the boundary memory means includes:
   (h3) means for storing the address of the lastly read-out word data so as to distinguish the boundary between the counted area and the uncounted area of the text storage area when the available memory area for the frequency data area runs out.

10. A word processor according to claim 1, wherein the boundary memory means includes:
    (h4) a display means for moving a cursor onto an initial letter of a first, uncounted word data based on a cursor data and for displaying a message indicating an over flow appears on a message line of a display when said determination means determines there is no unused area available.

11. A word processor according to claim 1, wherein the frequency count means includes:
- (f1) means for counting the frequency of use of the word data based on the address data of the word data stored in the frequency data area and the word data corresponding to the address data in the text storage area after the address storage means completes storing the address data in the frequency data area, and for storing the frequency of use of the word data in the frequency data area adjacent the corresponding address data.

12. A word processor according to claim 1, wherein the frequency count means includes:
- (f2) means for erasing the address data of identical word data to keep only one of the address data of the identical word data in the frequency data area when a plurality of the address data of the identical word data exist in therein.

13. A word processor according to claim 12, wherein the frequency count means includes:
- (f3) means for moving up following address data toward an address where the address data has been erased by said erasing means was stored in the frequency data area.

14. A word processor according to claim 13, wherein the frequency count means includes:
- (f4) means for subtracting the address corresponding to the erased address data from the address stored in the following word data which is moved up to a higher address.

15. A word processor according to claim 8, wherein the frequency count means includes:
- (f5) means for resuming determination of the frequency of use of the word data at the word data in the text storage area corresponding to the boundary after an available area is produced in the text memory.

16. A word processor according to claim 1, wherein the frequency count means includes:
- (f6) means for displaying the word data in association with the frequency of use of the word data on a display.

17. A word processor according to claim 16, wherein the frequency count means includes:
- (f7) means for displaying a table of counted word data and their respective frequency data as shown in an order of frequency of use.

18. A word processor having a capability of counting frequency of use of words, comprising:
- (a) an input means for inputting a text data and an instruction data into the word processor;
- (b) a text storage area provided in a text memory for storing the text data inputted by the input means;
- (c) a frequency data area provided in an unused, remaining area of the text memory for storing an address data of a word data in association with a frequency data of the word data, and a start point for defining the frequency data area being changeable according to the amount of the stored text data;
- (d) a read-out means for successively reading out the word data and the address data of the word data from the text memory;
- (e) an address storage means for successively storing the address data of the word data read out by the read-out means in the frequency data area according to a predetermined order;
- (f) a determination means for determining whether the unused area is available in the frequency data area each time the address data is stored by the address storage means;
- (g) a boundary memory means for storing the address data of either a lastly read-out word data read out by the read-out means or a next, first unread-out word data of the text storage area when the determination means determines that no available area exists in the text memory thereby creating a boundary between a counted area and an uncounted area of the text memory;
- (h) a frequency count means for counting the frequency of use of the word data in the text memory based on the address data stored in the frequency data memory and a corresponding word data in the text memory, and storing the frequency of use of the word data in association with the address data; and
- (i) means for displaying the word data in association with the frequency data thereof on a display.

* * * * *